United States Patent [19]

Hashimoto

[11] 4,360,258
[45] Nov. 23, 1982

[54] LENS SHUTTER MECHANISM FOR CAMERA

[75] Inventor: Akihiko Hashimoto, Hachioji, Japan

[73] Assignee: Olympus Optical Company Ltd., Japan

[21] Appl. No.: 289,084

[22] Filed: Jul. 31, 1981

[30] Foreign Application Priority Data

Oct. 2, 1980 [JP] Japan ................................. 55-138604
Oct. 2, 1980 [JP] Japan ........................... 55-141291[U]
Oct. 2, 1980 [JP] Japan ........................... 55-141292[U]
Oct. 2, 1980 [JP] Japan ........................... 55-141293[U]

[51] Int. Cl.³ ............................. G03B 3/10; G03B 9/08
[52] U.S. Cl. ..................................... 354/195; 354/234; 354/265
[58] Field of Search ................ 354/25 A, 25 R, 25 N, 354/25 P, 26, 29, 30, 36, 38, 42–44, 48–51, 230, 234, 235, 195, 196, 262, 265, 59, 264

[56] References Cited

U.S. PATENT DOCUMENTS

| | | | |
|---|---|---|---|
| 3,575,097 | 4/1971 | Gonzalez | 354/265 X |
| 3,645,187 | 2/1972 | Kitai | 354/265 X |
| 4,127,326 | 11/1978 | Matsumoto | 354/234 |
| 4,294,527 | 10/1981 | Hashimoto et al. | 354/25 |
| 4,295,715 | 10/1981 | Breen | 354/25 |

Primary Examiner—L. T. Hix
Assistant Examiner—William B. Perkey
Attorney, Agent, or Firm—Ostrolenk, Faber, Gerb & Soffen

[57] ABSTRACT

A lens shutter mechanism for camera includes a shutter opening/closing lever which opens or closes a shutter blade or blades. The lever is pivotally mounted on a movable shaft which is fixedly mounted on a shutter close lever. At the same time as an electromagnet, which is used to maintain the shutter open, is deenergized, the shutter close lever is operated to cause the shutter opening/closing lever to close the shutter blade or blades.

10 Claims, 8 Drawing Figures

LENS SHUTTER MECHANISM FOR CAMERA

BACKGROUND OF THE INVENTION

The invention relates to a lens shutter mechanism for a camera, or more particularly, to a lens shutter mechanism for a camera which opens and closes shutter blades, which also serve as diaphragm blades.

As is well recognized, there is a lens shutter of semi-open type which includes shutter blades also serving as diaphragm blades and begins to drive in a closing direction before the shutter blades reach their fully open position. Such a lens shutter makes it possible to definitely determine the the proper combination of shutter speed and diaphragm aperture in accordance with the brightness of an object being photographed. Consequently, it generally adopts a programmed exposure control scheme.

A conventional lens shutter of such programmed exposure control type, hereafter referred to as a program shutter, generally utilizes an electromagnet in order to maintain the shutter blades in their open condition. The electromagnet is effective to maintain a member, which is used to drive the shutter blades in their closing direction, in a position which corresponds to the fully open position of the shutter blades. Consequently, when a proper exposure of the film is reached before the shutter blades become fully open to cause the electromagnet to be deenergized, the member which drives the shutter blades in their closing direction initially moves from the position corresponding to the full open condition of the shutter blades to an intermediate position which corresponds to the proper exposure, followed by a closing operation of the shutter blades. This means that there is a delay from the time the proper exposure is reached until the closing operation of the shutter blades is initiated. Since the shutter blades remain open during this delay, there results an inconvenience such as an overexposure. A conventional shutter of the kind described has been incapable of accommodating for a changes in light received from an object being photographed which occurs during such delay, resulting in a poor accuracy of the exposure control. Such drawback is particularly remarkable during a high speed operation, as partly assisted by the complexity of the closing mechanism, resulting in a dissatisfactory operational stability.

Another disadvantage of a conventional program shutter is the incapability to serve as a diaphragm preset shutter assembly since the shutter blades are adapted to be operated by the release of a stored resilience, which prevents the shutter blades to be maintained in their semi-open condition.

In addition, the synchro contacts cannot be operated at an intermediate position of the shutter blades. This prevents a shutter operation as a so-called flashmatic shutter.

Furthermore, a conventional program shutter is of an ever-set type in which the drive to the shutter blades is derived from the resilience which is stored in response to the depression of a shutter release button. Consequently, such shutter suffers from an increased operating stroke of a shutter release member. Although a shutter is available in which the drive to the shutter blades is stored in connection with a film winding operation of a film winding mechanism, such shutter requires a connection with the film winding mechanism, resulting in a complex construction.

Where it is desired to provide a shutter of an electromagnetic release type, it is necessary to provide a release electromagnet, which requires an increased stroke for the member which operates the shutter.

Finally, a conventional program shutter generally employs an increased number of parts, requiring an increased space therefor.

On the other hand, a variety of distance adjusting mechanisms for camera are known in which a desired distance adjustment is achieved by driving a taking lens assembly by means of a drive motor. However, in the conventional mechanisms of this kind, the angular position of the drive motor has a definite or one-to-one correspondence to the distance focussed by the taking lens, and hence to maintain the taking lens at a selected distance, the drive motor must be held stationary at a corresponding angular position. Accordingly, the drive motor used in the distance adjusting mechanism must be provided as a devoted one, and cannot be utilized to operate a shutter, for example. Accordingly, when a full automation of the camera is contemplated, a plurality of motors must be provided within a camera, causing an increased size and increased cost thereof. Also, the plurality of motors must be sequentially controlled in accordance with a series of photographing operations, disadvantageously resulting in a complex control program utilized in a control circuit.

SUMMARY OF THE INVENTION

It is an object of the present invention to eliminate above disadvantages of the prior art by providing a lens shutter mechanism for a camera in which a shutter opening/closing lever is rockably mounted on a movable shaft so that a rocking motion of the lever and a movement of the movable shaft rapidly control an opening/closing operation of shutter blades.

It is another object of the invention to provide a lens shutter mechanism for a camera in which a rotatable control member which is driven by a drive motor is provided with a cam which operates a shutter and which is also connected to distance adjusting means which causes a taking lens to move for focusing purpose, so that a single drive motor may be utilized to operate the shutter and the distance adjusting means.

In accordance with the invention, a closing operation of shutter blades is immediately initiated at the time a shutter close signal is produced in response to a proper exposure of a film surface, thus minimizing delay time to enable an exposure control of high accuracy. A combination of simple operations, namely, a movement of movable shaft and a rocking motion of a shutter opening/closing lever which is pivotally mounted on the shaft, controls the opening/closing operation of shutter blades, whereby rapid and reliable operation is assured, increasing the stability of a high speed operation. Consequently, a photograph of a proper exposure can be taken of a bright object being photographed, by utilizing a film of a high speed such as ASA400, for example.

The aperture diameter defined by shutter blades is controlled by the angle through which the shutter opening/closing lever rocks, and hence they can be also used as a diaphragm preset shutter. The synchro contacts can be operated at an intermediate position of shutter blades, permitting the use of a flashmatic shutter.

By providing an arrangement in which the shutter opening/closing lever is driven by an electric motor, a self-charged shutter can be provided which does not require a drive force for the shutter blades to be charged before a shutter release operation. In this instance, a connection between the shutter mechanism and a film winding mechanism is dispensed with, and hence the arrangement is preferred for use in a camera of spool drive type in which a film is wound up by a spool. An electromagnetic release of the shutter is enabled by initiating the rotation of the motor, without utilizing a release electromagnet. In addition, the speed of rotation of the motor may be varied, permitting its use as a high speed shutter. This would be advantageous when effecting a special photography such as a daytime synchronized photographing while maintaining the diaphragm open.

The number of parts is reduced, and a modular design is enabled. Accordingly, the overall size can be reduced as compared with the prior art, facilitating its disposition within the camera.

The electromagnet which is used to maintain the shutter open is energized for a reduced time duration. Specifically, it will be energized only when opening the shutter, thus minimizing the power dissipation. A ratio of a spring resilience to the force produced by the electromagnet upon energization thereof for constraining the shutter closing lever against such resilience can be reduced. In this manner, the waste time which is required to deenergize the electromagnet can be reduced, contributing to a further improvement in the accuracy of exposure control.

Also, shocks and percussion sounds produced during the shutter operation can be reduced as compared with the conventional arrangements.

When a single drive motor is used to effect both a shutter operation and a distance adjustment, the manufacturing cost can be reduced while simultaneously reducing the size and weight of the camera. As a result of the simplified mechanism, the frequency of occurrence of failures is also reduced.

DESCRIPTION OF PREFERRED EMBODIMENT

Figure 1:
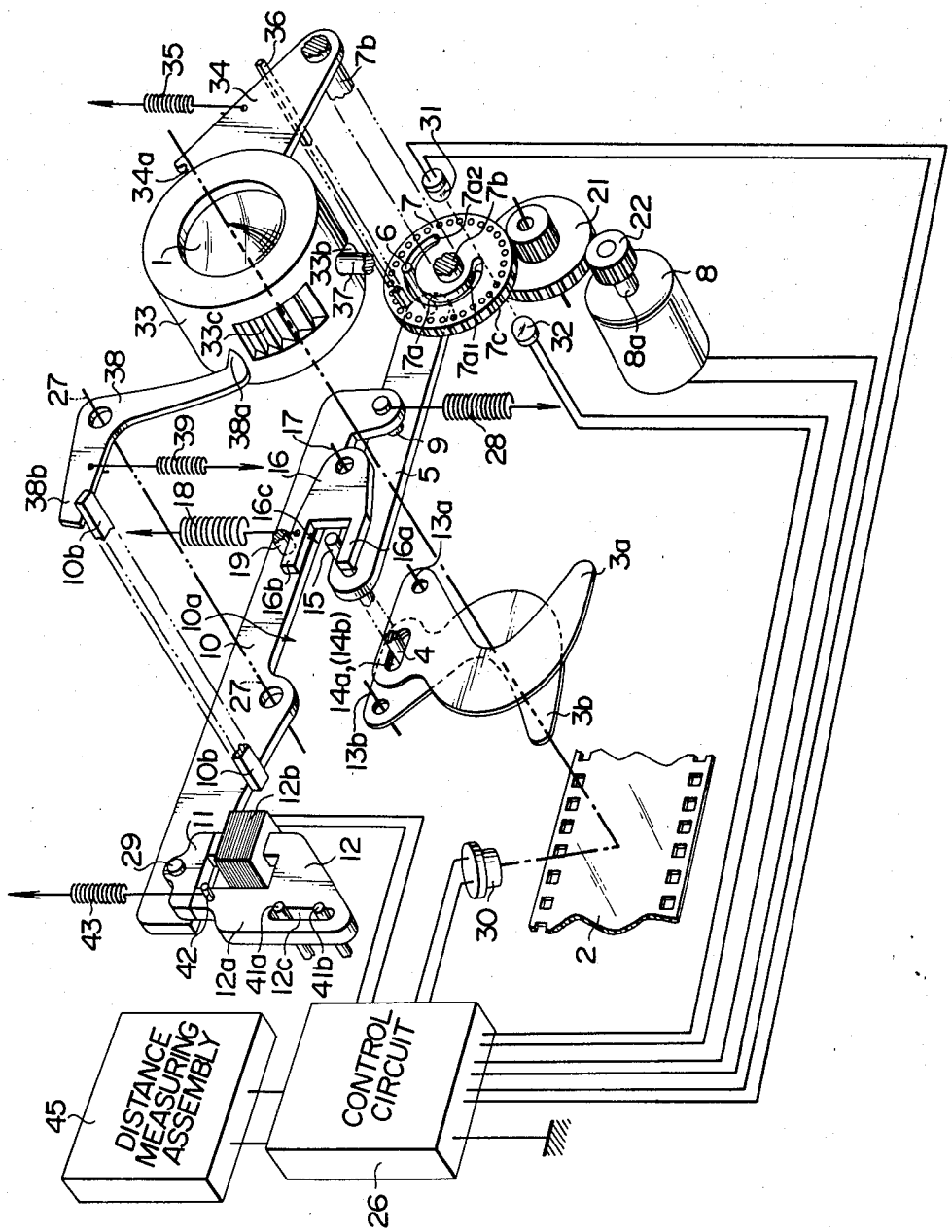
FIG. 1 is a perspective view of a lens shutter mechanism for camera according to one embodiment of the invention.

Referring to FIG. 1, there is shown a lens shutter mechanism for a camera which is constructed in accordance with one embodiment of the present invention. The camera includes a taking lens assembly 1 and a photographic film 2, between which a pair of shutter blades 3a, 3b are disposed for rocking motion by a drive pin 4 which is fixedly mounted on one end of shutter opening/closing lever 5, the other end of which fixedly carries a follower pin 6 which is fitted into a cam slot 7a formed in a prime mover gear 7, functioning as a rotatable control member. A reversible drive motor 8 is provided to cause a rotation of the gear 7. The lever 5 is pivotally mounted on a movable shaft 9 which is fixedly mounted on one end of a shutter close lever 10, the other end of which is provided with an armature 11 associated with an electromagnet 12, which normally functions to maintain the shutter open.

A distance adjusting mechanism which is associated with the lens shutter mechanism comprises a lens barrel 33 carrying the taking lens 1, a sector gear 34 which transmits the rotation of the gear 7 to the lens barrel 33, a reference pin 37 for causing an axial translation of the lens barrel 33 as the latter rotates, and a claw member 38 for maintaining the lens barrel 33 at an adjusted position.

The shutter blades 3a, 3b form together a vario type shutter which is well known, and have their one end pivotally mounted on pins 13a, 13b. Elongate slots 14a, 14b are formed in the respective shutter blades adjacent to their respective pivotal connections to receive the drive pin 4, whereby the shutter blades 3a, 3b move in an opening direction as the drive pin 4 moves upward, and moves in a closing direction as the drive pin 4 returns downwardly.

In addition to the drive pin 4 and the follower pin 6 fixedly mounted on the opposite ends thereof, the shutter opening/closing lever 5 additionally includes an engaging pin 15 which is fixedly mounted adjacent to said one end, but on the opposite surface from the drive pin 4. The engaging pin 15 is received in a notch 16c defined between a pair of widely spaced limbs 16a, 16b, shaped in the form of a fork, of a stop member 16, which is pivotally mounted on a stationary member, not shown, by a pin 17, at its opposite end. The stop member is urged to rotate clockwise about the pin 17 by a coiled tension spring 18 which is anchored to the limb 16b at its one end. However, the resulting rotation of the stop member 16 is normally limited by the abutment of the outside of the limb 16b against a stop pin 19 which is fixedly mounted on a stationary member, not shown.

The purpose of the stop member 16 is to provide a certain margin in the relative position between the rotary shaft 7b of the gear 7, to be described later, and a pin 29 on which the armature 11 is pivotally mounted, by resiliently urging the engaging pin 15 in order to prevent the motor 8 from being overloaded to cause its stop which might otherwise occur when the rotary shaft 7b and the pin 29 are not accurately located. In addition, the stop member 16 undergoes a slight rocking motion against the resilience of the coiled spring 18 whenever the shutter blades 3a, 3b are closed rapidly, thereby absorbing the impact.

Figure 2:
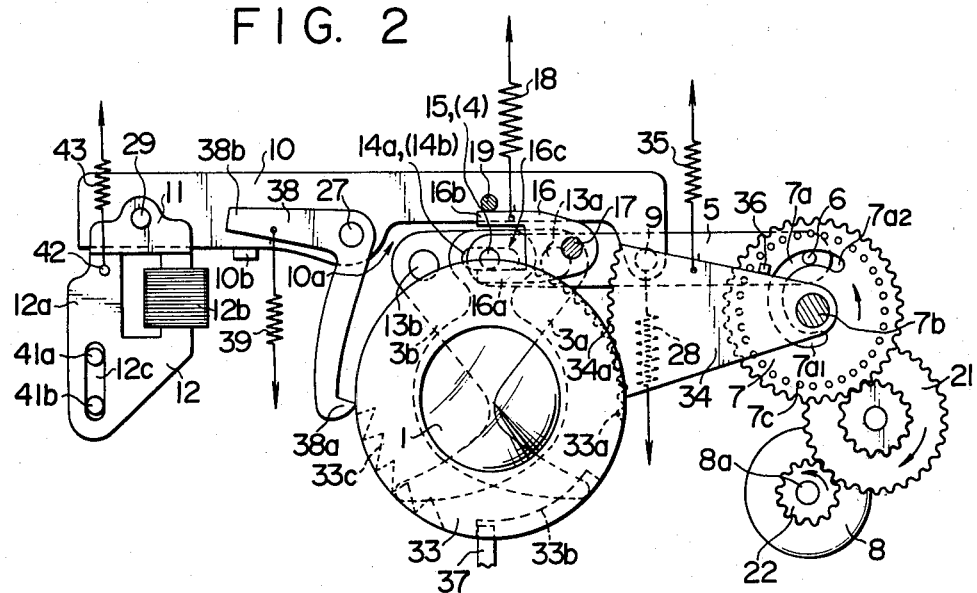
FIGS. 2 to 5 are front views illustrating various phases of operation of the lens shutter mechanism shown in FIG. 1.

The gear 7 is fixedly mounted on the rotary shaft 7b and meshes with a reduction gear 21, which in turn meshes with an output gear 22 fixedly mounted on the output shaft 8a of the motor 8. As shown in FIG. 2, the cam slot 7a formed in the gear 7 includes an involute section 7a$_1$ having a radially increasing spacing from the axis of the rotary shaft 7b as proceeding clockwise about the latter, and a concentric arcuate section 7a$_2$ which is connected to the first involute section. When the gear 7 rotates clockwise from its normal position shown in FIG. 2, the involute section acts through the follower pin 6 to cause the shutter opening/closing lever 5 to rock about the movable shaft 9. Along its periphery, the gear 7 is formed with a number of openings 7c which are disposed at substantially equal interval and which are utilized to detect the magnitude of angle through which it has rotated. At this end, referring to FIG. 1, a combination of light emitting element 31 and light receiving element 32 is disposed in alignment with each other on the opposite sides of the periphery of gear 7, thus forming optical position detecting means. The number of openings 7c detected is reflected in the number of peaks in a photocurrent produced by the element 32, and thus such number may be counted by a control circuit 26 to determine the angular position of the gear 7. It will be noted that one end of the sector gear 34, which is used to move the lens barrel 33 carrying the taking lens 1 to its adjusted position, is rotatably mounted on the rotary shaft 7b. The sector gear 34 is urged to rotate clockwise about the shaft 7b by a coiled tension spring 35. As the gear 7 rotates counter-clockwise from its normal position, the upper side of the sector gear 34 is driven by a barrel rotating pin 36 which is fixedly mounted on the gear 7 so as to be driven counter-clockwise about the drive shaft 7b.

The lens barrel 33 is a cylindrical body having the taking lens 1 received and supported therein. Along part of its outer periphery, the cylindrical body is formed with a barrel rotating gear 33a (see FIG. 2) which meshes with teeth 34a on the sector gear 34, a cam slot 33b which is used to cause an axial translation of the barrel 33 as the latter rotates, and a ratchet 33c for locking the barrel 33 at an adjusted position whenever it reaches there.

As viewed in FIG. 2 which shows the normal condition, the gear 33a is disposed in a portion of the outer periphery of the lens barrel 33 which corresponds to its first quadrant and has a width which covers the extent of movement of the lens barrel 33 in the direction of the optical axis. Again considering in FIG. 2 which shows the normal condition, the cam slot 33b is formed in a portion of the outer periphery of the lens barrel 33 which substantially corresponds to its fourth quadrant, in the form of a helix proceeding from the rear of the lens barrel to the front side in a clockwise rotation. The reference pin 37 fixedly mounted on a stationary member, not shown, of the camera is received in the cam slot 33b. Under the normal condition shown in FIG. 2, the reference pin 37 abuts against the rear end face of the cam slot 33b so that the lens barrel 33 is located to permit the taking lens 1 to be focused on to an object located at infinity. As mentioned previously, the coiled spring 35 urges the sector gear 34 to rotate clockwise about the rotary shaft 7b, and such rotation is transmitted through the teeth 34a and the gear 33a to urge the lens barrel 33 to rotate it counter-clockwise until the rear end face of the cam slot 33b bears against the reference pin 37.

Under the normal condition shown in FIG. 2, the ratchet 33c is formed in a portion of the outer periphery of the lens barrel 33 which substantially corresponds to its third quadrant, and has a width which covers the extent of movement of the lens barrel 3 in the direction of the optical axis (see FIG. 1). Under the normal condition shown in FIG. 2, the ratchet 33c is not engaged by a tip 38a of the claw member 38. However, in an adjusted position of the lens barrel 33 shown in FIG. 3 or 4, the ratchet is engaged by the tip 38a to maintain the lens barrel 33 at such position.

The claw member 38 is in the form of an inverted L-shaped lever which is pivotally mounted on a pin 27 at its bend. The claw member 38 is urged to rotate counter-clockwise about the pin 27, by a coiled tension spring 39 having its one end anchored to one arm of the member 38. However, under the normal condition shown in FIG. 2, the resulting rotation of the claw member 38 is limited by the abutment of the tip 38a, formed on the free end of the other arm of the claw member 38, against the outer peripheral surface of the lens barrel 33. After the distance adjustment illustrated in FIGS. 3 and 4, such rotation is limited by the engagement of the tip 38a with the ratchet 33c. The opposite end 38b of the claw member 38 is located opposite a release piece 10b which causes the tip 38a to disengage from the ratchet 33c, as will be further described later.

The shutter close lever 10 is pivotally mounted on the pin 27 which is in turn fixedly mounted on a stationary member, not shown, and is urged to rotate clockwise about the pin 27 by a coiled tension spring 28 having its one end anchored to the end of the lever on which the movable shaft 9 is fixedly mounted and thus acting in a direction to close the shutter. However, the resulting angular movement of the shutter closing lever 10 is normally blocked by the abutment of the engaging pin 15 against the limb 16a of the stop member 16 and the abutment of the follower pin 6 against the inside of the cam slot 7a, both achieved through the movement of the movable shaft 9 and the shutter opening/closing lever 5 in response to the angular movement of the lever 10. It will be noted that the half of shutter closing lever 10 located adjacent to the movable shaft is formed with a notch 10a to permit a movement of the engaging pin 15 therein, avoiding any interference with the movement of the engaging pin 15 within the notch 16c of the stop member 16. The release piece 10b extends from the lower edge of the shutter closing lever 10 in a direction parallel to the pin 27, at a point intermediate the remaining half of lever 10 which carries the armature 11. As mentioned previously, the release piece 10b extends to be located opposite the end 38b of the claw member 38.

Figure 5:
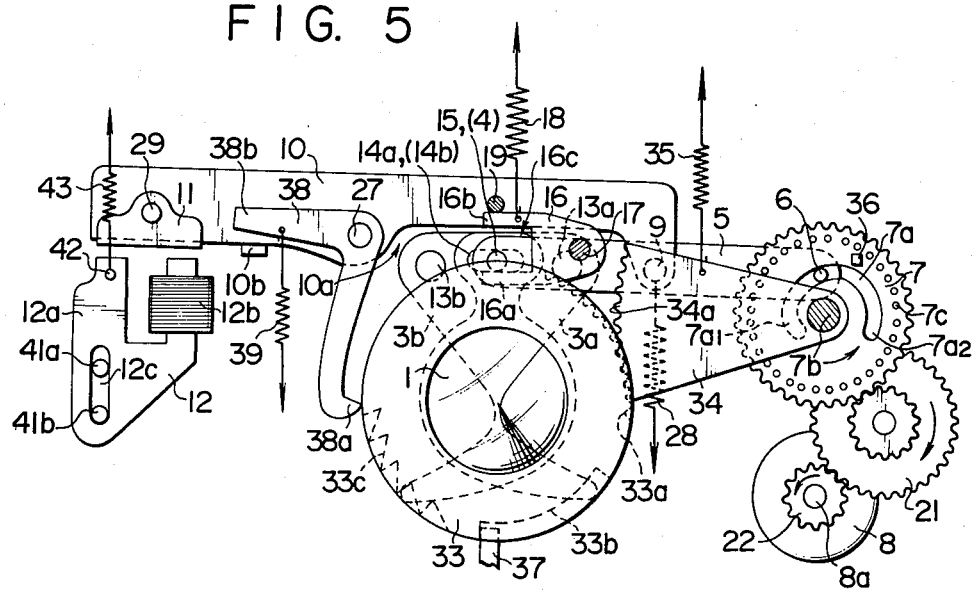

The armature 11 is mounted on the pin 29, which is fixedly mounted on the other end of the shutter closing member 10, so as to be rockable through a small stroke. The solenoid 12 which maintains the shutter open is disposed in opposing relationship with the armature 11, and includes a yoke 12a having a pair of limbs, on one of which an exciting coil 12b is disposed. The other limb has an increased width and has a guide slot 12c formed therein which is elongate in the lengthwise direction of this limb. A pair of guide pins 41a, 41b, fixedly mounted on a stationary member, not shown, of the camera are fitted into the slot 12c. The other limb fixedly carries a pin 42 adjacent to its free end, to which one end of a coiled tension spring 43 is anchored, thus urging the electromagnet 12 to slide in a direction toward the armature 11. However, under the normal condition shown in FIG. 2, the resulting movement of the electromagnet 12 is limited by the abutment of the electromagnet 12 against the armature 11 which in turn prevents a further angular movement of the shutter closing member 10 which carries the armature 11. Toward the end of the exposure of the film surface as illustrated in FIG. 5, the guide pin 41b bears against the lower end face of the slot 12c.

The exciting coil 12b of the electromagnet 12 has its opposite ends connected to the control circuit 26 so as to be fed with an exciting current upon initiation of a shutter release operation. The exciting current is interrupted when a photometric element 30, in the form of a photoelectric transducer element, connected to the control circuit 26 determines that the light reflection from the film surface indicates a proper exposure.

In FIG. 1, numeral 45 represents a distance measuring assembly which is adapted to determine a distance to an object being photographed automatically before the motor 8 is set in motion to initiate a distance adjusting operation of the taking lens 1. The control circuit 26 responds to a determination rendered by the assembly 45 to control the angle through which the motor 8 is rotated, thus allowing the taking lens 1 to be focused to a desired position.

In operation, when a shutter release button, not shown, of the camera is depressed, the control circuit 26 is turned on under the normal condition shown in FIGS. 1 and 2, whereby the transducer element 30, light emitting element 31 and light receiving element 32 are activated and simultaneously an exciting current is supplied to the electromagnet 12 to energize it, thus constraining the shutter close lever 10. At the same time, the assembly 45 is also activated, initiating the determination of a distance to an object being photographed.

Figure 3:
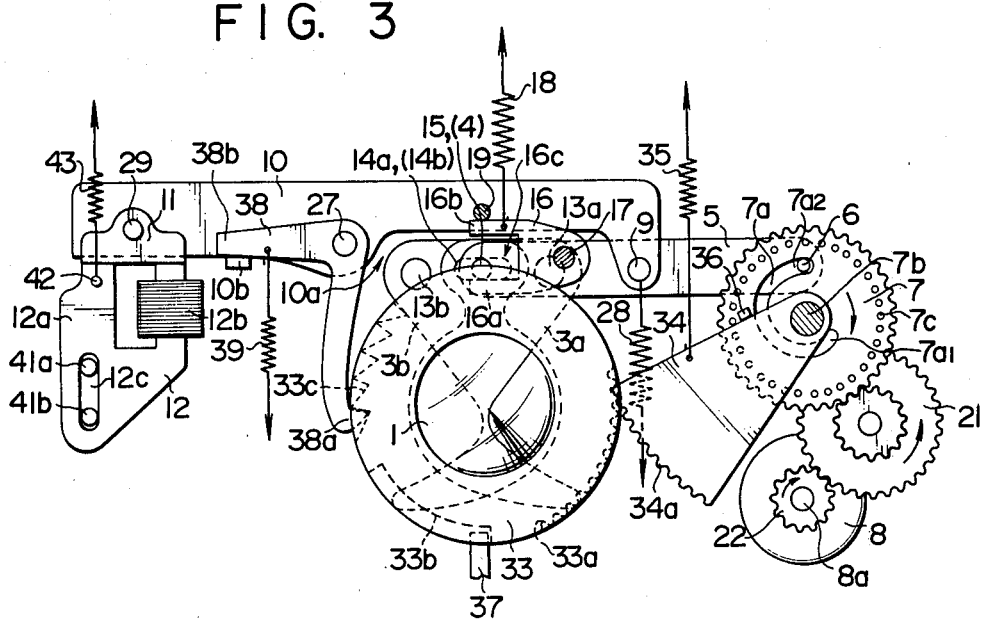
Figure 4:
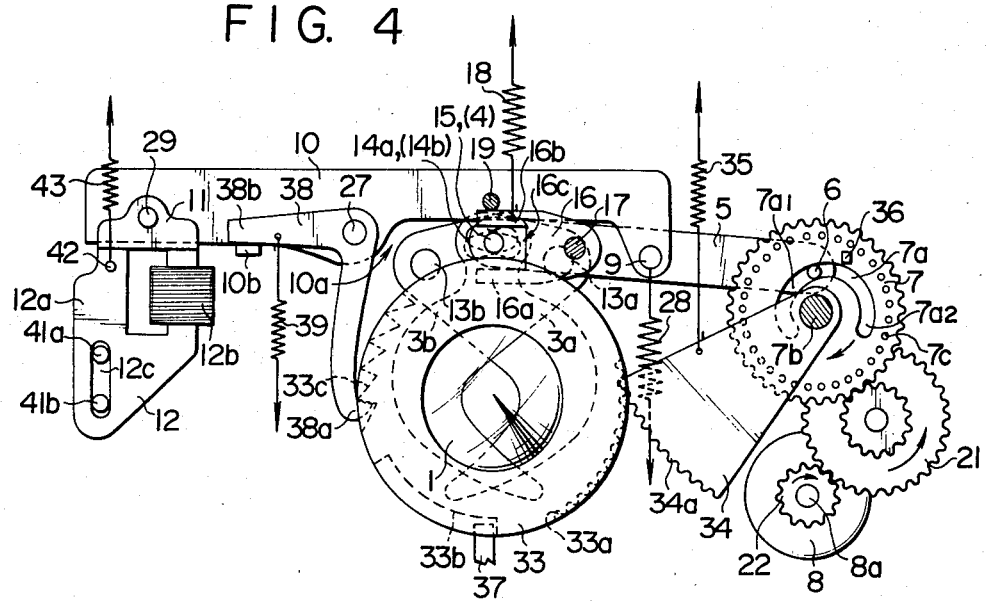

When the distance to an object being photographed is determined, the drive motor 8 is driven to rotate counter-clockwise, as indicated by an arrow in FIG. 2, whereby the prime mover gear 7 begins to rotate in the counter-clockwise direction as indicated by an arrow. The barrel rotating pin 36 then rotates counter-clockwise about the rotary shaft 7b, as shown in FIG. 3, whereby the sector gear 34 which has its upper side engaged by the pin 36 rotates counter-clockwise about the rotary shaft 7b against the resilience of the spring 35. The lens barrel 33 having the gear 33a which is meshed with the teeth 34a of the sector gear 34 rotates clockwise about the optical axis of the taking lens 1, and during such rotation, the cooperation between the cam slot 33b and the pin 37 causes a gradual shift of the lens barrel from its reference position where the taking lens 1 is focused at to infinity to a desired adjusted position where an object at a given distance is focused on the surface of film 2. The angular position of the prime mover gear 7 is continuously detected by the detecting means including both the elements 31, 32 (not shown in FIGS. 2 to 5), by detecting the openings 7c. When the lens barrel 33 shifts to a desired adjusted position which corresponds to the distance to an object being photographed which is determined by the assembly 45, the motor 8 ceases to rotate. Thereupon, the tip 38a of the claw member 38 engages one of the teeth formed in the ratchet 33c, thus maintaining the lens barrel 33 at such position. FIGS. 3 and 4 illustrate the minimum distance to an object being photographed and hence the forward-most position assumed by the lens barrel 33.

Subsequently, the motor 8 is driven to rotate in the clockwise direction as indicated by an arrow in FIG. 3, thus in the opposite direction from that mentioned above. The gear 7 then rotates clockwise as indicated by an arrow, beginning to return to its normal position shown in FIG. 2. However, the engagement between the tip 38a and the ratchet 33c to maintain the lens barrel 33 at its adjusted position prevents its returning movement to its normal position, and hence the sector gear 33 having teeth 34a which mesh with the gear 33a on the lens barrel 33 also cannot return to its normal position. Consequently, the pin 36 moves away from the upper side of the sector gear 34, turning clockwise about the rotary shaft 7b until it returns to its normal position shown in FIG. 2. This completes the distance adjusting operation of the lens barrel 33.

If the assembly 45 determines that an object being photographed is located at infinity, a rotation of the motor 8 in the counter-clockwise direction does not occur, and consequently the lens barrel 33 is left stationary at its reference position, without effecting any distance adjustment. During a distance adjusting operation, the pin 6 moves through the section $7a_2$ of the cam slot 7a, which is formed to be concentric with the rotary shaft 7b, and hence the shutter opening/closing lever 5 does not change its position.

The rotation of the motor 8 to return the gear 7 during the distance adjusting operation does not cease after the gear 7 has been returned to its normal position, but continues, thus beginning the opening operation of the shutter blades 3a, 3b. Specifically, referring to FIG. 4, in response to the clockwise rotation of the motor 8, the gear 7 rotates clockwise beyond its normal position shown in FIG. 2, and as the cam slot 7a moves, the follower pin 6 enters the slot section $7a_1$ to be driven toward the center of the gear 7. This causes the shutter opening/closing lever 5 to rotate clockwise about the movable shaft 9. Consequently, the drive pin 4 moves upward, whereby the elongate slots 14a, 14b engaged by such pin cause the shutter blade 3a to move clockwise about the pin 13a and cause the shutter blade 3b to move counter-clockwise about the pin 13b, respectively. As a result, the shutter opening begins to open gradually as shown in FIG. 4. This allows the light from an object being photographed to pass through the taking lens 1 to be incident on the photographic film 2, thus initiating the exposure of the film surface. It is to be noted that the light incident on the photographic film 2 is reflected therefrom to be received by the photometric element 30, which triggers a photometric operation for exposure control.

If the exposure of the film surface reaches a proper level at an intermediate position of the shutter, for example, in the course of the opening operation of the shutter blades 3a, 3b as illustrated in FIG. 4, the control circuit 26 ceases to supply the exciting current to the electromagnet 12 and also ceases to supply the drive current to the motor 8. Thereupon, the electromagnet 12 is deenergized to allow the shutter close lever 10 to move clockwise about the pin 27 under the resilience of the coiled spring 28. Consequently, the movable shaft 9 shifts down, but since the motor 8 ceases its rotation at this time, the gear 7 also ceases to rotate. Thus, the shutter opening/closing lever 5 moves counterclockwise about the follower pin 6 as the fulcrum, allowing the drive pin 4 to shift down. The downward movement of the drive pin 4 acts through the elongate slots 14a, 14b to move the shutter blades 3a, 3b counter-clockwise and clockwise, respectively, about the respective pins 13a, 13b, respectively, thus closing the shutter as shown in FIG. 5. In this Figure, the engaging pin 15 bears against the limb 16a of the stop member 16, and the angular movement of the shutter close lever 10 under the resilience of the coiled spring 18 is stopped by the abutment of the engaging pin 15 against the limb 16a as well as by the abutment of the follower pin 6 against the lateral side of the cam slot 7a, which occurs by the transmission through the movable shaft 9 and the lever 5. At the time the engaging pin 15 bears against the stop member 16, the latter slightly moves angularly about the pin 17 against the resilience of the coiled spring 18, thus absorbing shocks which are produced during the closure of the shutter. However, it should be noted that since the coiled spring 18 has greater resilience than the coiled spring 28, the stop member 16 immediately returns to a position where the limb 16b bears against the stop pin 19.

A release of the lens barrel 33 from the claw member 38 occurs in slightly delayed relationship with the closure of the shutter blades 3a, 3b. The release takes place as the shutter close lever 10 moves clockwise about the pin 27 when the release piece 10b provided on lever 10 drives the end 38b of the claw member 38 against the resilience of the coiled spring 39 until the tip 36a is disengaged from the ratchet 33c. When the lens barrel 33 is released, it is driven to rotate counter-clockwise under the resilience of coiled spring 35 which acts through the sector gear 34, and is fed forward by the cooperation between the cam slot 33b and pin 37 until it comes to a stop at the reference position where the pin 37 bears against the rear end face of the cam slot 33b, as shown in FIG. 5. It should be noted that when the lens barrel stops in this manner, the sector gear 34 has returned to its normal position, an the tip 38a of the claw member 38 no longer engages the ratchet 33c.

While the returning motion of the lens barrel 33 occurs in slightly delayed relationship with the completion of the closure of the shutter blades 3a, 3b as mentioned above, the degree of such delay can be chosen by controlling the timing when the release piece 10b bears against the tip 38b and choosing the depth of engagement between the tip 38a and the ratchet 33c.

Upon completion of the returning motion of the lens barrel 33 to its normal position, the motor 8 is then driven to rotate counter-clockwise, as indicated in FIG. 5, thus initiating the returning movement of the prime mover gear 7 to its normal position. As the gear 7 rotates counterclockwise, the cam slot 7a therein also moves, whereby the follower pin 6 which is located within the slot section 7a₁ moves in a direction away from the center of the gear 7, causing the shutter opening/closing lever 5 to move counterclockwise about the engaging pin 15 as the fulcrum which bears against the stop member 16. As a result, the movable shaft 9 shifts upward, and the shutter close lever 10 moves counterclockwise about the pin 27 against the resilience of the coiled spring 28. When the follower pin 6 reaches its normal position within the cam slot 7a as shown in FIG. 2, the shutter close lever 10 returns to a position where the armature 11 bears against the electromagnet 12, as indicated in FIGS. 1 and 2. At this point in time, the rotation of the motor 8 is stopped, and the lens shutter mechanism has returned to its normal condition which is assumed before taking a picture. Since the electromagnet 12 is arranged to be slightly movable by the provision of the elongate slot 12c and guide pins 41a, 41b and is urged toward the armature 11 by the coiled spring 43, the attracting surface of the electromagnet 12 bears flush against the mating surface of the armature 11.

If the exposure of the film surface does not reach a proper level when the shutter blades 3a, 3b have been moved to define a maximum shutter opening, the rotation of the motor 8 in the counter-clockwise direction is interrupted at the time the shutter has been fully open, and the maximum shutter opening is maintained. Subsequently, when the exposure reaches a proper level, the electromagnet 12 ceases to be energized, whereupon the shutter blades 3a, 3b are closed in the same manner as the proper exposure has been reaches during an intermediate shutter opening, thus allowing the lens shutter mechanism of the invention to return to its normal position which it assumed before taking a picture.

The above description of operation of the lens shutter mechanism covers the use of the shutter as a program shutter. When the shutter is to be used as a diaphragm preset lens shutter, a desired diaphragm aperture is inputted into the control circuit 26 from suitable means, not shown. During the shutter operation, the motor 8 is driven at a higher rate, opening the shutter blades 3a, 3b at a rapid rate. The diameter of the shutter opening has a one-to-one correspondence to the angular movement of the prime mover gear 7, which is continuously detected by the detection means including both the elements 31, 32 by counting the number of openings 7c detected, so that the control circuit 26 is operable to stop the rotation of the motor 8 when the shutter blades 3a, 3b have been opened to a point which corresponds to the preset opening diameter. Subsequently, it maintains this diameter of the shutter opening. Subsequently, when the exposure of the film surface reaches a proper level, the control circuit 26 interrupts the supply of the exciting current to the electromagnet 12, thus allowing the shutter blades 3a, 3b to be closed. In this manner, the exposure of the film surface is completed, and the shutter functions as a diaphragm preset lens shutter.

Since the control circuit 26 continuously detects the diameter of the shutter opening, a desired diameter of the shutter opening at which the synchro contacts are to be closed may be previously supplied to the control circuit 26, which then allows an electronic flash to be activated at the time the shutter reaches the desired opening diameter. Thus, a shutter operation as a flashmatic shutter is enabled, and also a special photographing operation such as daytime synchronized photographing can be performed.

In the lens shutter mechanism shown in FIGS. 1 to 5, the lens barrel detent mechanism which maintains the lens barrel 33 containing the taking lens 1 at an adjusted position comprises the single claw member 38, which is released from the lens barrel 33 as the shutter close lever 10 moves angularly to effect a shutter closure. Accordingly, where a multiple exposure to the fim surface is attempted with this lens shutter mechanism, the lens barrel 33 is returned to its reference position from an individual adjusted position corresponding to each exposure, thus requiring a repeated distance adjustment for each exposure. This means that the adjusted position of the taking lens 1 varies between individual exposures, making it impossible to provide a plurality of exposures while maintaining the taking lens 1 at the same adjusted position.

Similarly, since the lens barrel 33 is returned to its reference position after each shutter release operation, it is impossible to take pictures in a plurality of frames in succession while maintaining the same adjusted position of the taking lens 1.

Figure 6:
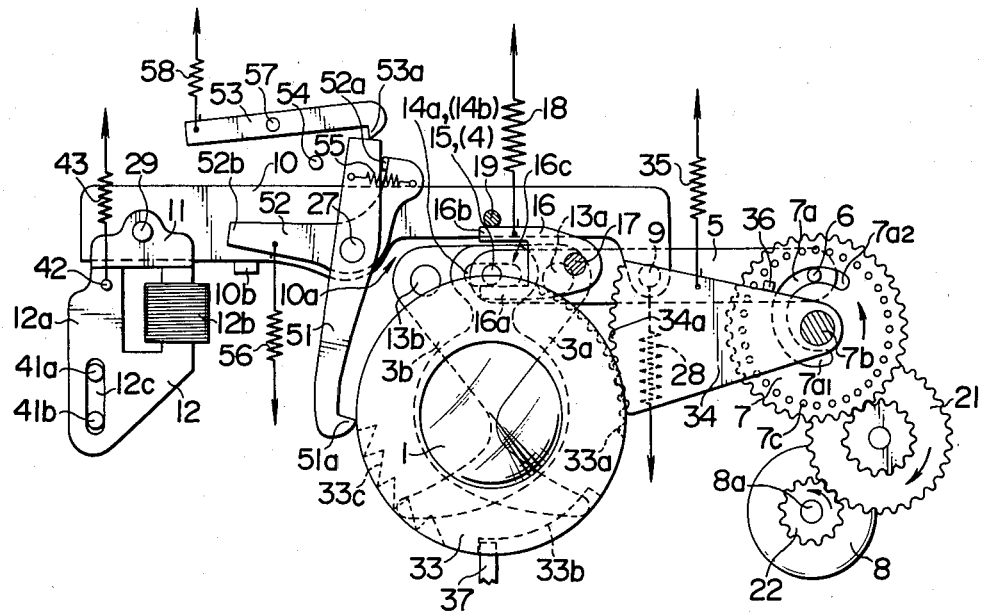
FIG. 6 is a front view of another form of lens barrel detent mechanism which may be used in the lens shutter mechanism of FIG. 1.

FIG. 6 shows another form of lens barrel detent mechanism for use in the lens shutter mechanism of the invention in which the detent member which maintains the lens barrel at an adjusted position is associated with a barrel lock means which selectively operates to disable the detent member from being released, thereby allowing a choice between a multiple exposure where individual exposure can be repeated at the same adjusted position and a single exposure for which the distance adjustment is individually made. The lens barrel detent mechanism of this embodiment comprises a detent member in the form of a claw member 51 which maintains the lens barrel 33 at an adjusted position, a released lever 52 which is mounted in concentric relationship with the claw member 51, a barrel lock lever 53 engaging with one end of the claw members 51 to maintain it at a position where it locks the lens barrel 33, and a movable pin 54 for selectively bringing the lock level 53 to positions where it is engageable with or not engageable with the claw member 51.

The claw member 51 comprises a londitudinally elongate lever which is pivotally mounted on the pin 27, and its lower end is provided with a claw 51a which is engageable with the ratchet 33c formed on the lens barrel 33. The released lever 52 is disposed between the claw member 51 and the shutter close lever 10, and is in the form of a bellcrank-shaped lever which is also pivotally mounted on the pin 27. It includes a horizontal arm, the end 52b of which is located opposite to the release piece 10b formed on the shutter close member 10. A coiled tension spring 56 has its one end anchored to the horizontal arm, thus causing the released lever 52 to be urged for counter-clockwise rotation about the pin 27. A coiled tension spring 55 extends between the upper arm of the claw member 51 and the vertical arm of the released lever 52, thereby urging the claw member 51 and the released lever 52 toward each other. However, the resulting movement of the claw member 51 and the released lever 52 toward each other is normally limited by the abutment of a folded piece 52a formed along one lateral edge of the vertical arm of the released lever 52 toward its free end against one lateral side of the claw member 51. When so limited, the claw member 51 is integral with the released lever 52.

The lock lever 53 is formed by a horizontal lever which is pivotally mounted on a pin 57 which is fixedly mounted on a stationary member, not shown. One end of the lock lever 53 is formed with a claw 53a which is engageable with the upper end of the claw member 51 while the other end of the lever 53 is engaged with one end of a coiled tension spring 58, which urges the lever 53 to rotate clockwise about the pin 57. However, the resulting rotation of the lock lever 53 is normally limited by the abutment against the movable pin 54 which then assumes a position 54A representing the non-choice of the same adjusted position (see FIG. 8), and thus remains at rest at a position 53A where it does not engage the claw member 51. However, when the pin 54 moves to the position shown in FIG. 6 where the same photographing distance is chosen, the angular movement of the lever 53 is only limited by the abutment of the end of the lever against the upper end of the claw member 51.

It is to be understood that the location of the movable pin 54 is established by an operating member, not shown, which is provided on the part of the camera so as to assume either position where a same photographing distance is chosen or not chosen.

Figure 7:
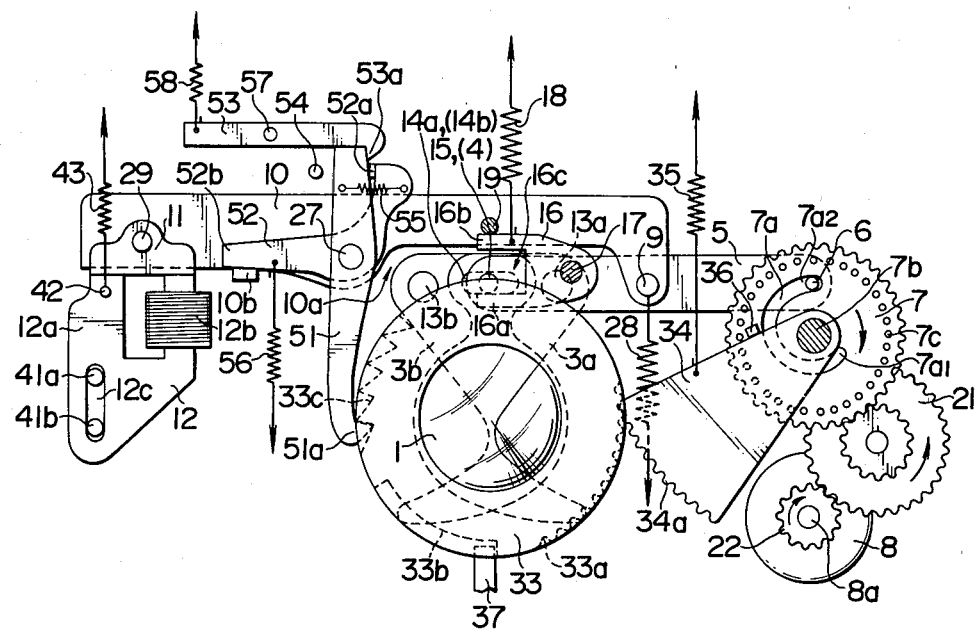
FIGS. 7 and 8 are front views illustrating different phases of operation of the detent mechanism shown in FIG. 6.

Describing the operation of the barrel lock mechanism together with the operation of the lens shutter mechanism, the depression of a shutter release button, not shown, sets the motor 8 in motion, which then rotates counter-clockwise, as shown by an arrow in FIG. 6. The rotation is transmitted through the sector gear 34 to rotate the lens barrel 33 clockwise, thus performing a distance adjustment of the taking lens 1. When the lens barrel 33 has rotated to its adjusted position, the rotation of the motor 8 is interrupted. Simultaneously, claw 51a of the claw member 51 engages with one of the teeth on the ratchet 33c to maintain the lens barrel 33 at such position, as indicated in FIG. 7. At the same time, the claw 53a of the lock lever 53 engages the upper end of the claw member 51.

Subsequently, the motor 8 is driven to rotate the clockwise as indicated by an arrow in FIG. 7, whereby the follower pin 6 enters the section 7a₁ of the cam slot 7a, causing the shutter opening/closing lever 5 to move clockwise about the movable shaft 9 to thereby open the shutter blades 3a, 3b, thus initiating the exposure of the film surface.

When the exposure of the film surface reaches a proper level and the electromagnet 12 is deenergized, the resilience of the spring 28 causes the shutter close lever 10 to move clockwise about the pin 27, whereby the shutter opening/closing lever 5 moves counter-clockwise about the follower pin 6 as the fulcrum, thus closing the shutter blades 3a, 3b to terminate the exposure of the film surface.

Figure 8:
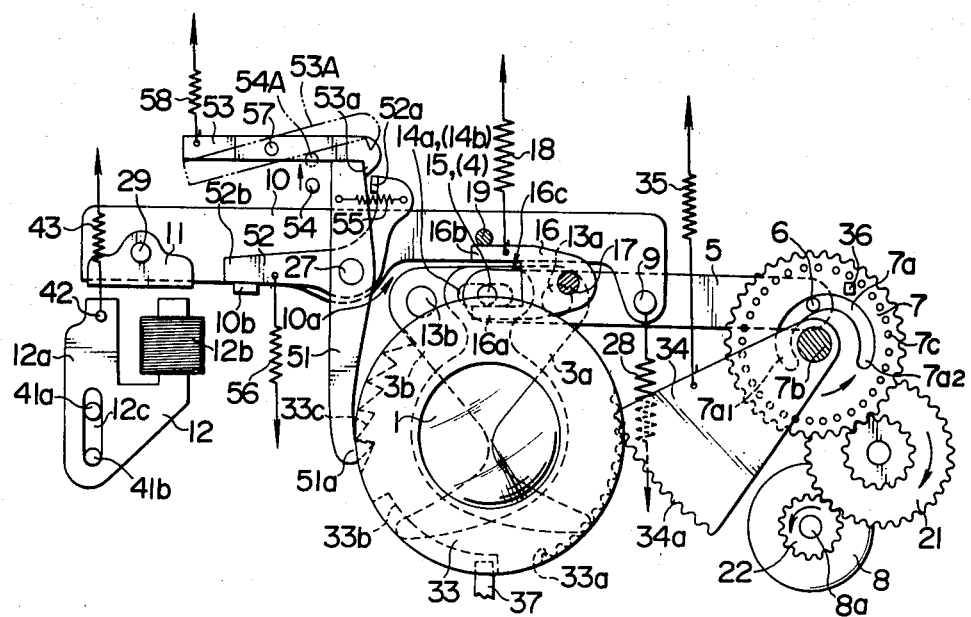

As the shutter close lever 10 moves clockwise about the pin 27, the release piece 10b drives the end 52b of the released lever 52 to cause it to move clockwise about the pin 27, as shown in FIG. 8. This movement acts through the spring 55 on the claw member 51, thus tending to cause it to move clockwise about the pin 27. However, the claw member 51 is prevented from moving clockwise by the claw 53a of the lock lever 53, and hence cannot move angularly. As a result, the engagement between the claw 51 and the ratchet 33c is maintained, and the lens barrel 33 does not return to its reference position, but is maintained at its adjusted position.

Subsequently, after the shutter close lever 10 has returned to its normal position shown in FIG. 6 as a result of the rotation of the motor 8 in the counter-clockwise direction, as indicated by an arrow in FIG. 8, the lens barrel 33 remains locked in its adjusted position, without returning to its reference position.

Hence, by repeating the rotation of the motor 8 to operate the shutter, a second exposure can be made with the same distance adjustment of the taking lens 1 as before. During the second exposure, there is no need to perform a distance adjustment, so a suitable signal may be applied to the control circuit 26 (FIG. 1) to allow the motor 8 to rotate clockwise from the beginning, thus performing only the shutter opening/closing operation while omitting the distance adjustment.

When it is desired to disengage the claw member 51 from the lock lever 53, the movable pin 54 may be moved in a direction indicated by an arrow in FIG. 8 until the position 54A is reached where the same photographing distance is not selected. This causes the lock lever 53 to be driven counter-clockwise about the pin 57 by means of the pin 54, thus disengaging the lock lever 53 from the claw member 51. Release means, not shown, may be provided to cause the claw member 51 to move slightly in the clockwise direction about the pin 27 as the movable pin 54 is moved from its same distance select position to its non-selected position. This allows the claw 51a to be disengaged from the ratchet 33c as the pin 54 is moved to its non-select position, whereby the lens barrel 33 is automatically returned to its reference position.

The above description covers the operation which occurs where the lens barrel detent mechanism is set to permit photographing operations at the same distance. However, where the mechanism is set to allow an automatic distance adjustment, the movable pin 54 is located at the non-select position 54A and the lock lever 53 is retracted to its disengaged position, whereby the claw member 51 and the released lever 52 are integral with each other, functioning in the same manner as the claw member 38 disclosed above in connection with FIGS. 1 to 5. Thus, each time the shutter close lever 10 moves clockwise about the pin 27, the claw 51 is disengaged from the ratchet 33c, returning the lens barrel 33 to its reference position. Hence, an individual distance adjustment of the taking lens 1 is enabled for each exposure.

What is claimed is:

1. A lens shutter mechanism for a camera, comprising:
   a shutter blade adapted to be opened and closed to permit an exposure of a film surface;
   a shutter opening/closing lever moand connected to said shutter blade in such a manner that said shutter blade opens when said shutter opening/closing lever is moved in said first direction and said shutter blade closes when said shutter opening/closing lever is moved in said second direction;
   shutter opening drive means for operating the shutter opening/closing lever in said first direction to open the shutter blade;
   a movable shaft on which the shutter opening/closing lever is pivotally mounted;
   a shutter close lever carrying the movable shaft on its one end;
   means for urging the shutter close lever for angular movement along a first direction of an arc, which movement causes the shutter opening/closing lever to move in said second direction to close said shutter blade; and
   an electromagnet for attracting an armature mounted on the shutter close lever to constrain the shutter close lever against the angular movement in said first direction of said arc.

2. A lens shutter mechanism according to claim 1 in which the shutter opening drive means comprises a rotatable control member having a prime mover cam formed thereon which is engaged by a follower member mounted on one end of the shutter opening/closing lever, and a drive motor for rotating the control member.

3. A lens shutter mechanism according to claim 2 in which the rotatable control member is in the form of a prime mover gear having an involute cam slot formed therein which is centered about the axis thereof, the cam slot being engaged by a follower pin which is fixedly mounted on one end of the shutter opening/closing lever.

4. A lens shutter mechanism according to claim 2 in which the rotatable control member is associated with detecting means which detects the angle through which the control member has rotated.

5. A lens shutter mechanism according to claim 4 in which the detecting means comprises a plurality of openings formed in an array around the periphery of the control member, and a pair of light emitting element and light receiving element disposed in opposing relationship with each other and on the opposite sides of the peripheral part of the control member.

6. A lens shutter mechanism according to claim 1 in which the shutter opening drive means is connected to a distance adjusting mechanism for a taking lens.

7. A lens shutter mechanism according to claim 6 in which the distance adjusting mechanism for the taking lens comprises a lens barrel which carries the taking lens therein, resilient means for urging the lens barrel toward a reference position, a gear formed on part of the lens barrel for transmitting a drive to the lens barrel from the shutter opening drive means, against the action of the resilient means, a cam formed on part of the lens barrel for causing an axial translation of the lens barrel as the lens barrel rotates, a ratchet formed in part of the lens barrel for locking the lens barrel once the lens barrel has been translated to an adjusted position, and a barrel detent mechanism for engaging the ratchet to maintain the barrel at the adjusted position.

8. A lens shutter mechanism according to claim 7 in which the barrel detent mechanism comprises a claw member pivotally mounted on the shutter close lever, whereby the claw member is disengaged from the ratchet as the shutter close lever operates to close the shutter blade.

9. A lens shutter mechanism according to claim 7 in which the barrel detent mechanism comprises a claw member pivotally mounted on the shutter close lever, a released lever disposed in concentric relationship with the claw member, a barrel lock lever engaging with one end of the claw member to maintain it engaged with the lens barrel, and a movable member for selectively bringing the lock lever to a position engageable with or another position not engageable with the claw member, to barrel detent mechanism being selectively locked in place or released from its detent position in response to the operation of the shutter close lever to close the shutter.

10. A lens shutter mechanism according to claim 1 in which one of the electromagnet and the armature is biased toward the other while permitting a slight movement thereof.

* * * * *

UNITED STATES PATENT AND TRADEMARK OFFICE
CERTIFICATE OF CORRECTION

PATENT NO.   : 4,360,258
DATED        : November 23, 1982
INVENTOR(S)  : Akihiko Hashimoto It is certified that error appears in the above-identified patent and that said Letters Patent are hereby corrected as shown below:

In Claim 1, line 13 cancel "moand" and substitute therefor --movable in first and second directions and--.

Signed and Sealed this

Fourteenth Day of August 1984

[SEAL]

Attest:

GERALD J. MOSSINGHOFF

Attesting Officer

Commissioner of Patents and Trademarks